(12) United States Patent
Mendis et al.

(10) Patent No.: US 7,716,190 B2
(45) Date of Patent: May 11, 2010

(54) CONVERSION OF STRUCTURED INFORMATION

(75) Inventors: Venura C Mendis, Ipswich (GB); Ian C Kegal, Ipswich (GB); Paul W Foster, Felixstowe (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 10/547,420

(22) PCT Filed: Mar. 5, 2004

(86) PCT No.: PCT/GB2004/000938

§ 371 (c)(1),
(2), (4) Date: Aug. 31, 2005

(87) PCT Pub. No.: WO2004/084094

PCT Pub. Date: Sep. 30, 2004

(65) Prior Publication Data

US 2006/0167909 A1      Jul. 27, 2006

(30) Foreign Application Priority Data

Mar. 21, 2003   (GB)   ................................. 0306610.7

(51) Int. Cl.
*G06F 17/00* (2006.01)
(52) U.S. Cl. ...................... 707/694; 715/248
(58) Field of Classification Search ....................... None
See application file for complete search history.

(56) References Cited

U.S. PATENT DOCUMENTS

| | | | |
|---|---|---|---|
| 5,708,828 A * | 1/1998 | Coleman | 707/E17.006 |
| 5,970,490 A * | 10/1999 | Morgenstern | 707/10 |
| 6,003,035 A | 12/1999 | Breame | |
| 6,226,675 B1 | 5/2001 | Meltzer et al. | |
| 6,772,413 B2 * | 8/2004 | Kuznetsov | 709/231 |
| 7,035,468 B2 * | 4/2006 | Yogeshwar et al. | 707/E17.031 |
| 7,043,687 B2 * | 5/2006 | Knauss et al. | 709/223 |

(Continued)

FOREIGN PATENT DOCUMENTS

EP     1172735 A1     1/2002

(Continued)

OTHER PUBLICATIONS

Oracle9iAS Integration, An Oracle Technical White Paper, Japan 2003 http://www.oracle.com/technology/products/dataint/pdf/9iR2IntegrationWP.pdf.

(Continued)

*Primary Examiner*—Tim T. Vo
*Assistant Examiner*—Jau-Shya Meng
(74) *Attorney, Agent, or Firm*—Nixon & Vanderhye PC

(57) ABSTRACT

Structured information data sets structured according to a first predefined structure are converted into data sets structured according to a second predefined structure by way of an intermediate data structure. Conversion rules are defined to convert from each of the first and second predefined structures into the intermediate data structure and from the intermediate data structure into each of the first and second predefined structures. A pre-processor is provided to carry out initial processing tasks on a received data set to make it more susceptible to structural processing according to the conversion rules, and a post-processor is provided to carry out tasks such as vocabulary and data type conversion.

19 Claims, 6 Drawing Sheets

U.S. PATENT DOCUMENTS

| | | |
|---|---|---|
| 2003/0018499 A1 | 1/2003 | Miller et al. |
| 2003/0018666 A1 | 1/2003 | Chen et al. |
| 2003/0023604 A1* | 1/2003 | O'Brien et al. ............. 707/100 |
| 2004/0153459 A1* | 8/2004 | Whitten et al. ................ 707/10 |
| 2004/0221292 A1* | 11/2004 | Chiang et al. ............... 709/246 |

FOREIGN PATENT DOCUMENTS

| | | | |
|---|---|---|---|
| EP | 1274018 A2 | 1/2003 | |
| WO | WO 00/56033 | 9/2000 | |

OTHER PUBLICATIONS

Oracle98 Integration: The Foundation of E-Business. An Oracle White Paper, Jun. 2002 http://www.oracle.com/technology/products/integraton/files/Product_Overview_Paper_904.pdf.

International Search Report.

* cited by examiner

CONVERSION OF STRUCTURED INFORMATION

This application is the US national phase of international application PCT/GB2004/000938 filed 5 Mar. 2004 which designated the U.S. and claims benefit of GB 0306610.7, dated 21 Mar. 2003, the entire content of which is hereby incorporated by reference.

BACKGROUND

1. Technical Field

This invention relates to information conversion and in particular to the conversion of information data sets comprising data elements structured according to a first predefined structure into information data sets comprising data elements structured according to a second predefined structure, by way of an intermediate structure.

2. Related Art

It is known to define information in a structured manner using a structured mark-up language such as the eXtensible Mark-up Language (XML) Version 1.0 as defined for example in a document published on the Internet by the Worldwide Web Consortium. XML Version 1.0 provides an open and flexible specification for annotating information with a predefined set of meta-information using an unlimited number of possible meta-information structures. In this way, information may be personalised and customised for individuals or for groups of individuals.

Attempts are being made to standardise on the use of meta-information for annotating information in particular domains by means of agreed schemata. For XML version 1.0 documents, in particular, a document description language has been agreed, called the XML Schema language, for use in creating XML schemata that define the structure and vocabulary to be used to create XML documents in a given domain. The XML schema language has been defined in two parts in documents published on the Internet in May 2001 by the Worldwide Web Consortium. This approach is intended to standardise the meta-information associated with different pieces of information content to enable data exchange and other forms of content analysis to be more generic and hence to enable more effective access to information content annotated by meta-information that is common across a given domain. Unfortunately, while XML encourages standardisation, it has led to several hundred different competing XML schemata, sometimes in similar industries. Many of these schemata are in the adoption phase, e.g. for the financial, manufacturing, education and other industries (a list of XML schemata can be found at www.xml.org), but it is considered unlikely that XML documents generated in a given domain will ever be uniformly compliant with published "standard" schemata.

It is therefore desirable for information content providers to be able to supply information content described using a number of different schemata and to convert easily between them. Different information content providers may use variations on a given schema, or similar organisations may use the same schema but may have defined their own vocabularies for certain elements, to produce schema variants specific to their own organisations. Conversion between XML documents compliant with such schemata may take various forms, as illustrated in the diagram of FIG. 1.

Referring to FIG. 1, three different types of XML document conversion are shown where XML documents compliant with a Schema A 100 need to be converted into XML documents compliant with a Schema B 105. Where vocabularies and data types used in the two schemata A 100 and B 105 are identical, then conversion between respectively compliant XML documents involves a direct mapping 110 with no transformation being required. Where vocabularies and data types used in the two schemata A 100 and B 105 are different, but structurally the schemata are identical, then conversion between respectively compliant XML documents involves only vocabulary and data type transformation 115. Where the two schemata A 100 and B 105 are different, then conversion between respectively compliant XML documents involves both structural transformation 120 and vocabulary/data type transformation 115.

Data in an XML document is the information contained in text nodes of its elements and also in attributes of those elements. The most commonly used technology for XML document conversion is XSLT, adopted as a standard by the Worldwide Web Consortium and defined in a document published on the Internet. This language can be used to manipulate XML documents by reordering or reformatting information and can perform simple restructuring of meta-information contained in an XML document. There are a number of commercially available tools that can be used to produce and test XSLT stylesheets, including Marrowsoft Xselerator™ and TIBCO™ XML Transform. It is also known from n-tier hub-based technology (ACM, SIGMOD, March 2002) to build a schema translation engine using a database table to list common elements in XML documents and hence to translate between them.

While XSLT can provide means for performing conversion of at least the less complex structures in XML documents, a different XSLT stylesheet is usually required to convert from one schema-compliant format to another, so that if there are n different schemata in use, n(n−1) different XSLT stylesheets are required to achieve all the conversions likely to be required between XML documents compliant with those n schemata. Besides the need for a number of different XSLT stylesheets, there are also complications in using XSLT to convert certain types of structure, in particular recursive structures.

BRIEF SUMMARY

According to a first aspect of the present invention there is provided an apparatus for converting a data set structured according to a first predefined structure into a data set structured according to a second predefined structure, the apparatus comprising:

a store for storing mappings between data elements of said first predefined structure and data elements of a predefined intermediate structure and between data elements of said predefined intermediate structure and data elements of said second predefined structure;

an input for receiving a data set to be converted; and data conversion means arranged to select mappings from said stored mappings according to the structure of data elements in a received data set and according to a predefined target structure, and to apply the selected mappings to generate a target data set having said predefined target structure, wherein, in use, on receipt of a data set structured according to said first predefined structure, the data conversion means are operable to generate a target data set having said predefined intermediate structure and, upon receipt of a data set structured according to said predefined intermediate structure, to generate a target data set having said second predefined structure.

By establishing an intermediate structure to enable document conversions to be carried out in a two-stage "hub"

conversion process, the number of different types of structural conversion that need to be performed is reduced from n(n−1) to 2n, where there are n schemata in respect of which conversions are required. For example, when the apparatus according to this first aspect of the present invention is applied to the conversion of XML documents, the number of XSLT stylesheets required to convert XML documents is similarly reduced. The intermediate structure represents a "canonical" structure to which any form of XML structure may be converted and from which any such XML structure may be generated. Therefore, to effect all possible conversions between XML documents, only one XSLT stylesheet is required to convert from each schema-compliant form to the intermediate structural form, and one XSLT stylesheet to convert from the intermediate structural form back to the schema-compliant form. The intermediate structure provides a temporary database for the storage of data contained in a source XML document having a first XML structure prior to generation of a target XML document having a second XML structure.

Through the use of an intermediate structure and so two conversion (e.g. XSLT) stages, a true many-to-many mapping is achievable between "source" and "target" data sets together with a more concise and efficient intermediate language, particularly as elements with similar semantic meaning may be directly mapped to the same element in the intermediate structure. This makes for a more scalable, powerful and easier to convert arrangement than has been shown possible in prior art arrangements.

In a preferred embodiment, the apparatus comprises pre-processing means arranged to carry out pre-processing tasks with regard to data elements defined according to the predefined structures. The pre-processing tasks include adjusting the structure of data elements in a received data set to enable conversion by the data conversion means.

Preferably, the apparatus further comprises post-processing means arranged to carry out post-processing tasks with regard to data elements defined according to the predefined structures. The post-processing tasks include performing a semantic translation of terms contained in a received data set into terms defined according to the second predefined structure.

Using both pre- and post-processing stages, the apparatus is arranged to implement each of the two conversion stages as a three-stage process, enabling transformation of complex structures that cannot otherwise be mapped easily to a database table.

In a preferred embodiment of the present invention, the post-processing means are arranged with access to a thesaurus, and semantic translation of terms in the received data set comprises:

(i) obtaining, from the thesaurus, at least one term that is semantically equivalent to a term of the received data set;

(ii) comparing said at least one semantically equivalent term with a set of terms defined according to said second predefined structure; and (iii) in the event of a positive match, selecting a matching term for use in said semantic translation.

For this a natural language thesaurus or other lexical reference source may be used to obtain semantically equivalent words or phrases, for example a reference database such as Wordnet™, accessible over the Internet. Preferably, a word stemming algorithm is used to stem words prior to obtaining semantically equivalent words from the lexical reference source, a suitable stemming algorithm being the Porter Stemmer algorithm, as described in M. F. Porter: An Algorithm for Suffix Stripping, Automated Library and Information Systems, Vol. 14, No. 3, pp. 130-137, 1980.

According to a second aspect of the present invention there is provided a method for converting a data set structured according to a first predefined structure into a data set structured according to a second predefined structure, the method comprising the steps:

(i) receiving a data set comprising data elements structured according to said first predefined structure;

(ii) applying a first set of rules to convert said data elements in the received data set into an intermediate data set comprising data elements of a predefined intermediate structure; and (iii) applying a second set of rules to convert said intermediate data set into a data set comprising data elements structured according to said second predefined structure.

BRIEF DESCRIPTION OF THE DRAWINGS

Preferred embodiments of the present invention will now be described by way of example only and with reference to the accompanying drawings of which.

DETAILED DESCRIPTION OF EXEMPLARY EMBODIMENTS

As discussed in the introductory part of this patent specification, a need arises for conversion between, for example, XML documents compliant with different respective XML Schemata.

Figure 1:
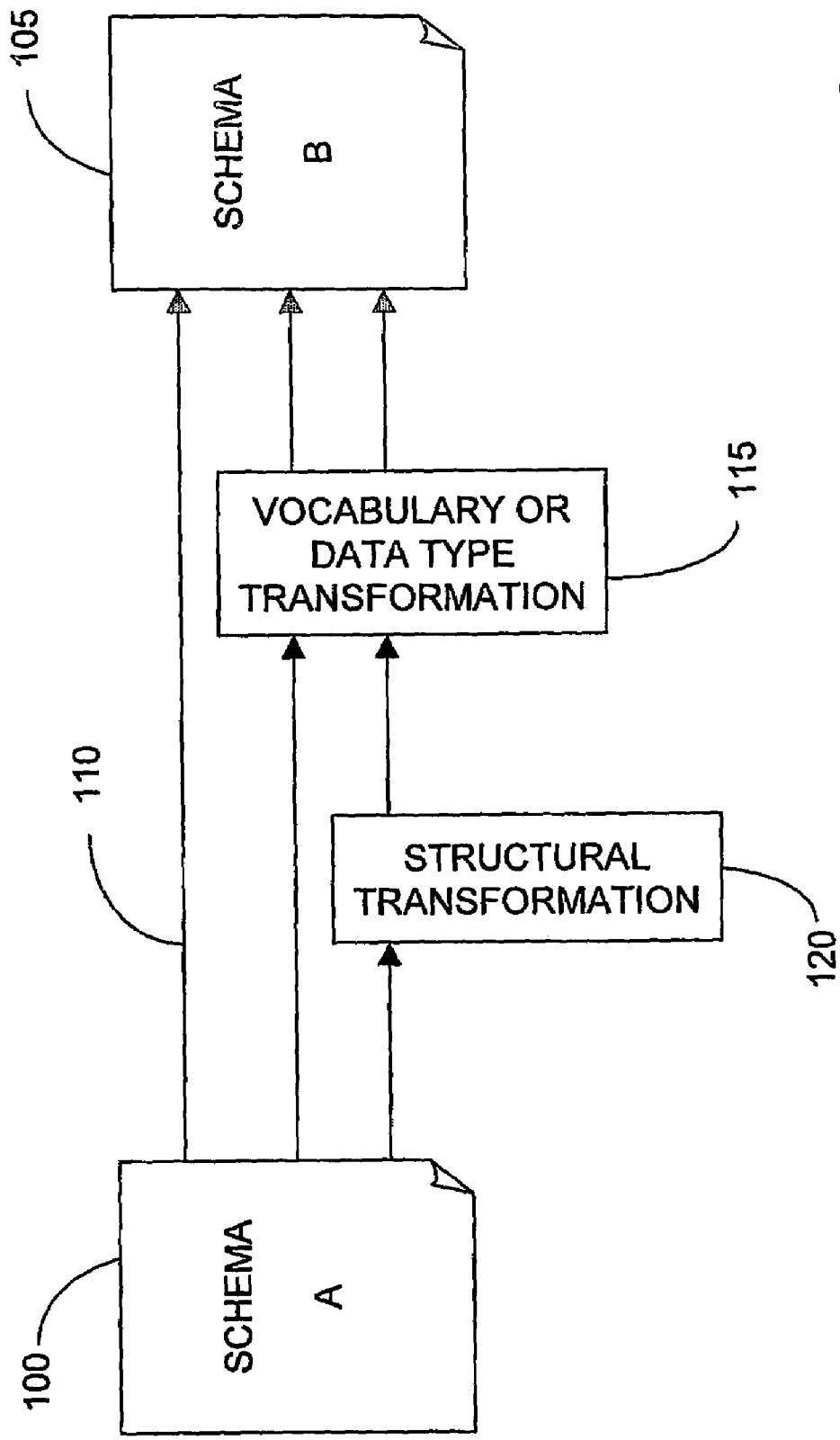
FIG. 1 is a diagram illustrating the different types of conversion likely to be required, and has been described above.
Figure 2:
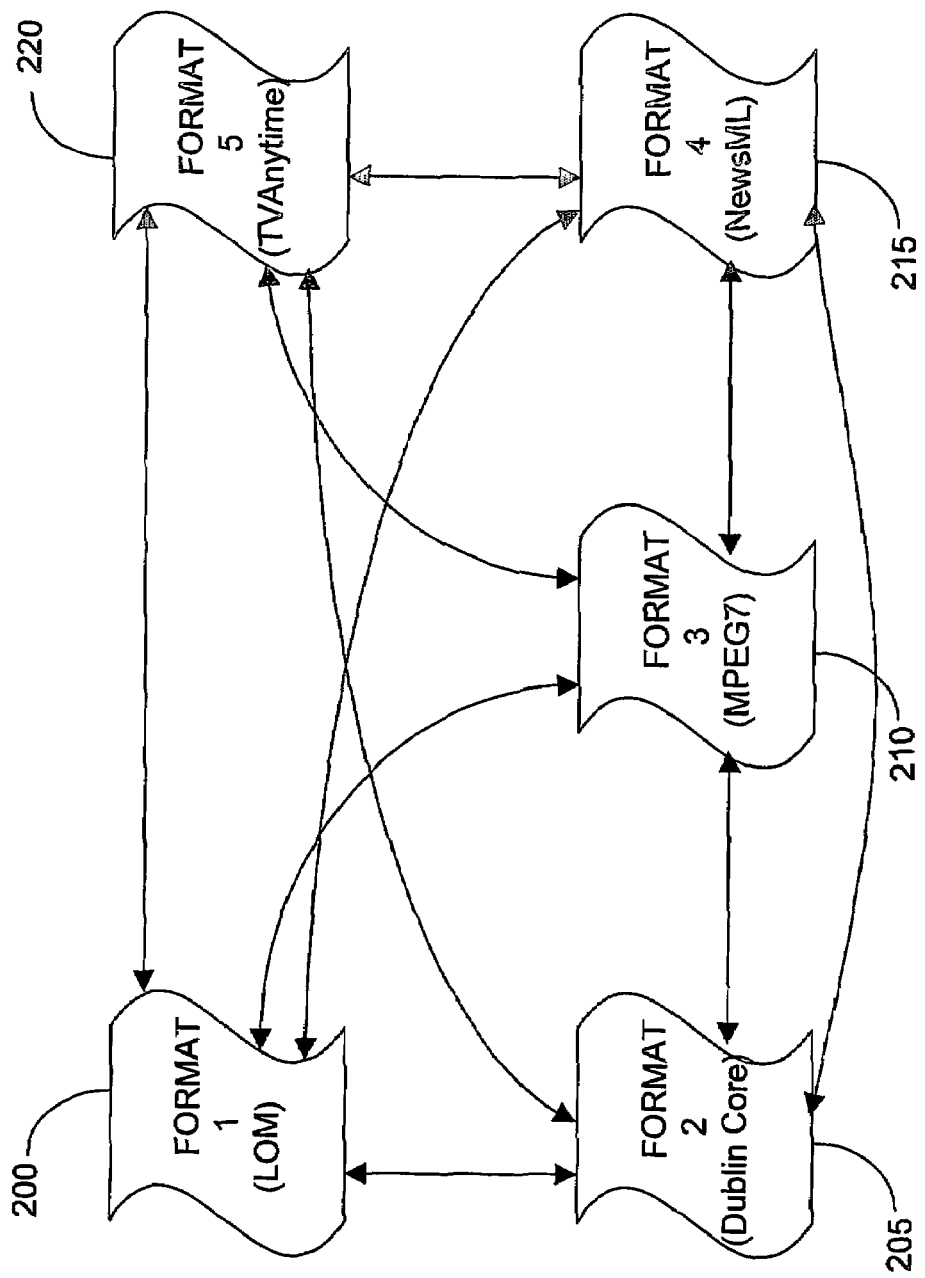
FIG. 2 is a diagram illustrating an example of a set of conversions likely to be required between different formats in prior art arrangements.

Referring to FIG. 2, five different formats 200 to 220 of information content are shown, together with an illustration of the 20 different format conversions that would be required in prior art arrangements to achieve format conversion from any one format to another.

Preferred embodiments of the present invention enable the number of necessary format conversions to be reduced considerably, from a theoretical maximum of n(n−1) conversions where there are n different formats, to a maximum of 2n conversions.

Figure 3:
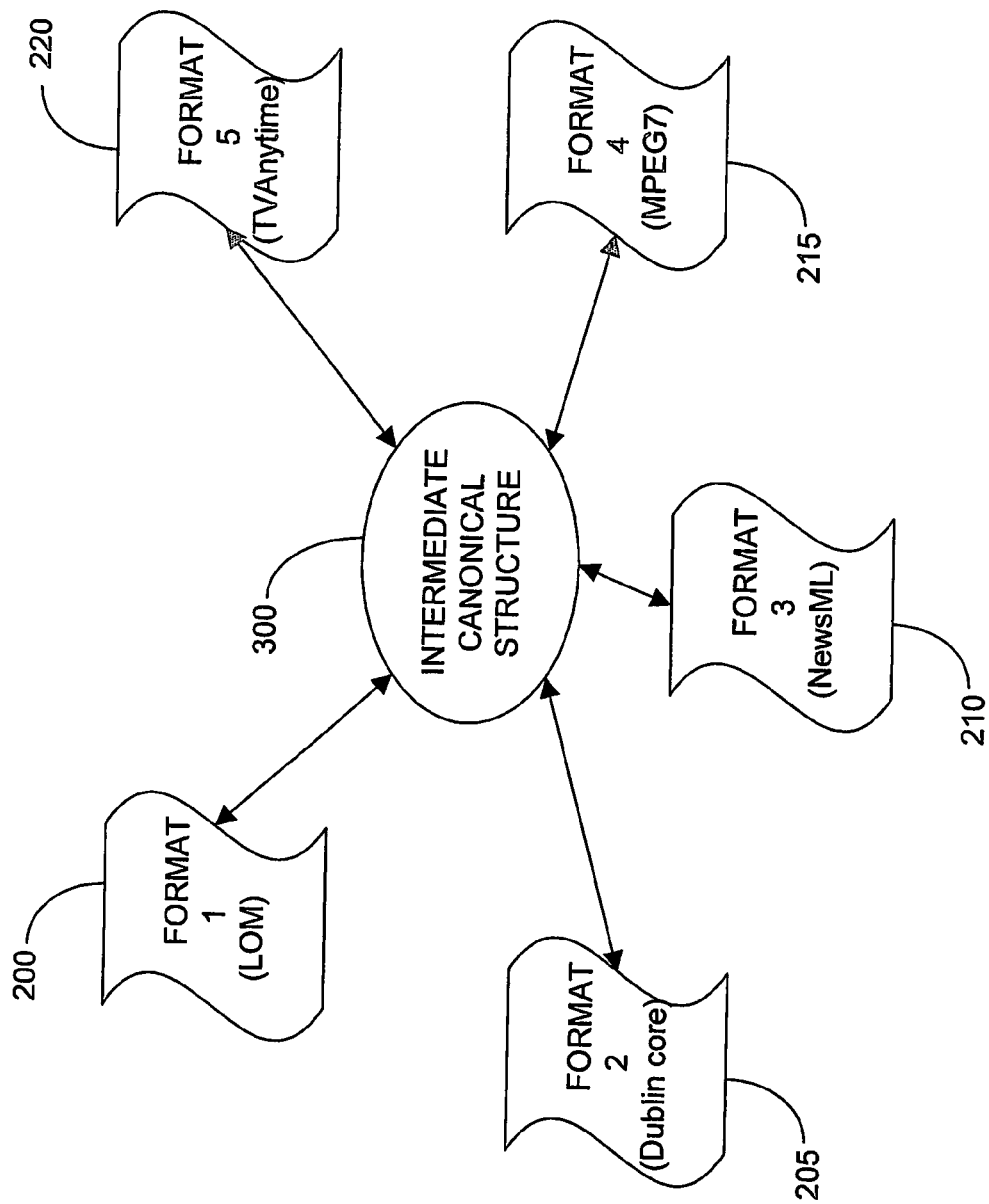
FIG. 3 is a diagram illustrating the format conversions required to achieve conversion between the formats shown in FIG. 2 when using preferred embodiments of the present invention.

Referring to FIG. 3, the same five formats 200-220 from FIG. 2 are shown, though by inserting an intermediate "canonical" structure 300, a "hub" conversion arrangement may be provided having the advantage that only 10 different conversions are necessary to achieve format conversion from any one format 200-220 to another.

An apparatus according to a first embodiment of the present invention for carrying out format conversions, by way of an intermediate canonical structure 300, will now be described with reference to FIG. 4.

Figure 4:
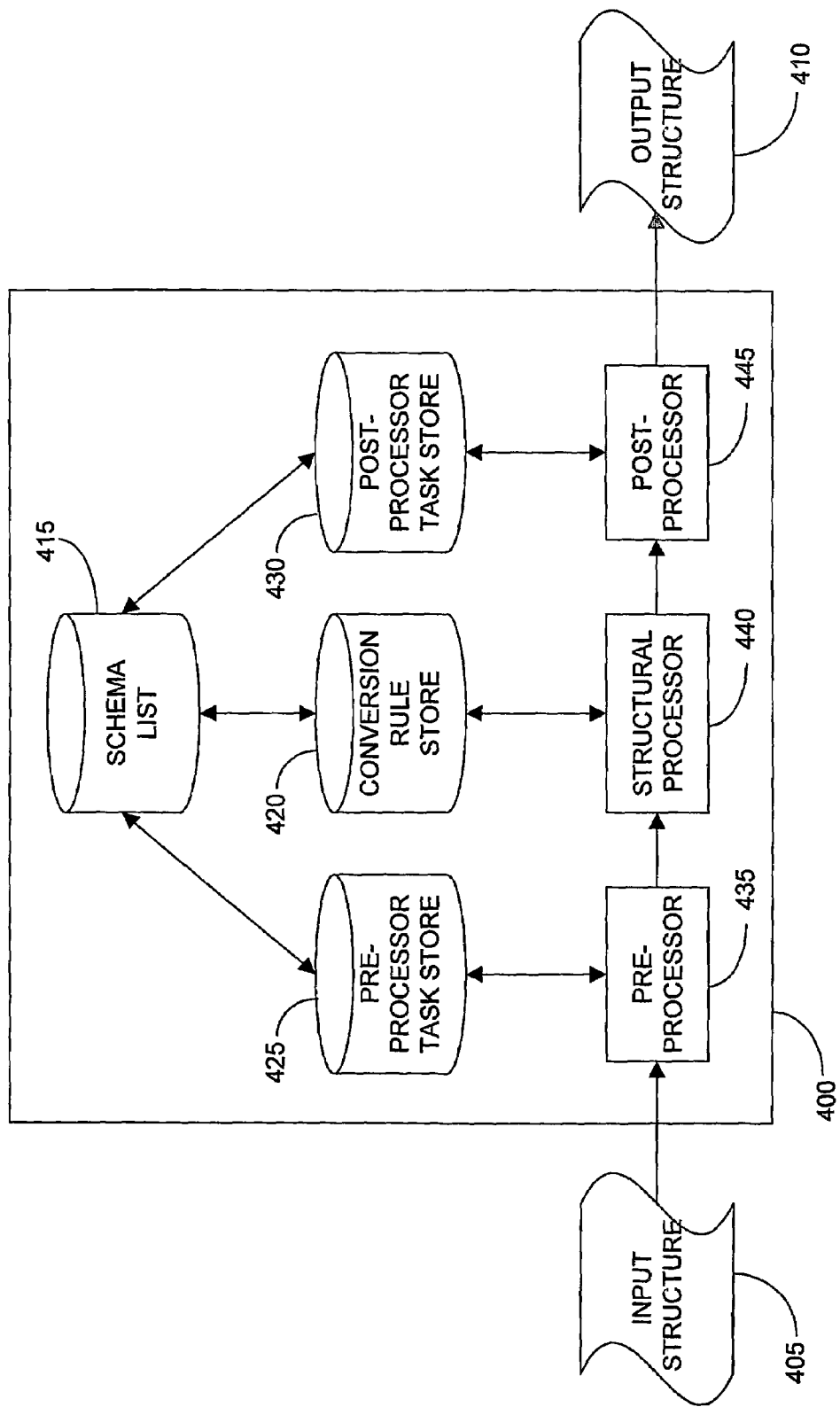
FIG. 4 is a diagram showing the functional elements of an apparatus according to a preferred embodiment of the present invention.

Referring to the diagram of FIG. 4, an apparatus 400 is shown for converting an information data set, for example an XML document, having an input data structure 405, into an information data set, for example another XML document, having an output data structure 410. The input data structure 405 may relate either to a "source" data set to be converted, or to an intermediate canonical data structure 300. Similarly, the output data structure 410 may relate either to a "target" data set (where the input data structure 405 is an intermediate canonical data structure 300) or to an intermediate canonical data structure 300 (where the input data structure 405 is a "source" data set to be converted). Thus the apparatus 400 is used in both stages of a hub conversion arrangement to convert a source data set into a target data set by way of the intermediate canonical data structure 300. However, for the purposes of describing the apparatus 400 with reference to FIG. 4, it will be assumed that the input data structure 405 relates to a data set to be converted and the output data structure 410 relates to the intermediate canonical data structure 300. The same functionality nevertheless applies directly to conversion from the intermediate canonical structure 300 to a target data set 405.

In order for the apparatus 400 to carry out conversions from one data structure to another, features are provided to define and control the way in which those conversions will be carried out. The structures to be converted are defined by particular schemata. In the case of XML documents, XML schemata are defined using an XML Schema language, referenced above. Each schema in respect of which data structures are to be converted are "registered" in the apparatus 400. "Registration" for a particular schema comprises the following steps:

(1) storing, in a store 415, a reference to the schema;

(2) storing, in a store 420, a set of rules for converting different structural elements defined in the schema, specifically to enable mapping of those structural elements to elements defined in the intermediate canonical structure 300, and to enable mapping of elements defined in the intermediate canonical structure 300 to those structural elements defined in the schema;

(3) storing, in a store 425, a set of pre-processing tasks that need to be carried out on a received input structure 405 prior to application of the conversion rules (420), the conversion rules (420) having been defined at step (3) to take account of the effect of applying the pre-processing tasks (425);

(4) storing, in a store 430, a set of post-processing tasks that need to be carried out to complete the conversion to an output structure 410, where the output structure is either the intermediate canonical structure 300 or a structure defined by the schema; and (5) where required, extending the intermediate canonical structure 300 within predetermined constraints relating to its overall structure, e.g. to retain an essentially "flat" structure, defining any additional elements specific to the schema being registered in the apparatus 400, so that the intermediate canonical structure 300 may function as an output structure 410 in respect of conversions from structural elements defined by the schema being registered.

The apparatus 400 comprises a pre-processor 435, linked to the pre-processor task store 425, arranged on receipt of an input structure 405 to identify the registered schema (415) with which the input structure 405 complies and to carry out an initial analysis and conversion of the input structure 405 according to any pre-processor tasks defined in the store 425 (see schema registration step 3 above) for the identified schema (415). For example, certain types of input structure 405 may not be easily convertible using defined conversion rules (420) alone. The pre-processor 435 is arranged, for example, to simplify the input structure 405 to make it susceptible to structural conversion, for example by inserting dummy attributes or elements into the input structure 405. A particular example will be described below to show how pre-processing of an input structure 405 by the pre-processor 435 can make the input structure 405 more susceptible to structural conversion.

The pre-processed structure is then output to a structural processor 440. The structural processor 440 is linked to the conversion rules store 420 and is arranged to carry out the main structural conversion of the input structure 405 into a required output structure 410—the intermediate canonical structure 300 for the purposes of this part of the description—by applying conversion rules stored in the store 420 in respect of the identified schema (415).

Preferably, the main role of the structural processor 440 is in mapping structural elements of a first structure to structural elements of a second structure. Conversion rules (420) used for this purpose, particularly in the XML context, are not ideally suited to performing semantic and other forms of data type conversion. For this, a post-processor 445 is provided. The post-processor 445 is arranged with access to the post-processor task store 430 (see schema registration step 4 above) to carry out any tasks defined in respect of the identified schema (415) to complete the conversion to the output structure 410 (the intermediate canonical structure 300 in this example). Preferably, post-processing tasks (430) include translating data defined in a vocabulary for the input structure 405 into data defined in a vocabulary for the output structure 410. However, in practice, such data translation tasks are more likely to be carried out when the apparatus 400 is being used to convert from the intermediate canonical structure 300 into a target data set 410 defined according to another registered schema (415). The post-processor 445 may also comprise means for accessing a set of "plug-in" software components, each selected to carry out a particular type of data conversion. The post-processor 445 may also be used for example to carry out date or time format changes, or conversion of number bases. Preferably, the post-processor task store 430 is arranged to store mappings between vocabularies used in registered schemata (415) or, more generally, the post-processor 445 is arranged with access to a thesaurus or an equivalent database (not shown in FIG. 4) for obtaining synonyms of terms used in an input structure 405. For example, when there is no direct mapping available between terms used in an input structure 405 and terms used in an output structure 410, the post-processor 445 is arranged to access a thesaurus to obtain a set of one or more semantically equivalent terms to each unmapped term used in the input structure 405, to compare each in the set of obtained terms with terms defined, for example in the store 430, in respect of the output structure 410 and hence to select appropriate semantically equivalent terms to use in generating the output structure 410. The post-processor 445 may also be arranged to implement a known language translation algorithm to translate not only between semantically equivalent terms, but also to translate terms into equivalent terms in another language.

The apparatus 400 of FIG. 4, and its use, will now be described in the specific context of converting between XML documents compliant with different XML schemata.

Referring again to FIG. 4, those schemata defining XML data and structures to be converted by the apparatus 400 are first registered according to the registration steps defined above. In particular, corresponding steps to those defined above are followed to register each schema in the apparatus 400, as follows:

(1) store a reference to the schema in the schema list store 415;

(2) compose and store, in the conversion rule store 420, an XSLT stylesheet to perform structural mapping of element structures defined in the schema to elements defined in the intermediate canonical structure 300, and an XSLT stylesheet to perform structural mapping of elements defined in the intermediate canonical structure 300 to element structures defined in the schema;

(3) define and store, in the pre-processor task store 425, a set of pre-processing rules and tasks required to perform initial structural processing of element structures defined in the schema, in particular those element structures that are difficult to convert using XSLT stylesheets, e.g. nested element structures (see below) for which a tailored solution for conversion would otherwise be required in each case;

(4) define and store, in the post-processor task store 430, a set of post-processing tasks such as data type conversions and value or data translation tasks that need to be carried out, in particular to complete the conversion from data stored in the intermediate canonical structure 300 to data for insertion into a target data set 410 compliant with the schema (though post-processing tasks may also be defined to complete conversion to the intermediate canonical structure 300); and (5) where required, define any additional structural elements in the intermediate canonical structure 300, specific to the schema being registered in the apparatus 400, so that the intermediate canonical structure 300 may function as an output structure 410 in respect of conversions from structural elements defined by the schema being registered.

As stated above, the pre-processor 435 is arranged in particular to carry out any initial processing of the input structure 405 needed to make it susceptible to XSLT processing, in particular where XML elements are used recursively in the input structure 405. For example, a portion of an input XML document (405) may be structured as follows:

```
<taxonpath>
    <taxon>
        <entry>Natural Science</entry>
        <taxon>
            <entry>Physical Science</entry>
            <taxon>
                <entry>Astronomy</entry>
            </taxon>
        </taxon>
    </taxon>
</taxonpath>
```

In this portion of XML, the same <taxon> element is used in a nested fashion at three levels within a hierarchy of XML elements. In a conventional XSLT matching and mapping process, knowledge of the particular level at which a <taxon> element is used would be lost in the mapping to the intermediate canonical structure 300. However, through processing by the pre-processor 435 in accordance with pre-processor tasks defined in the store 425 for the respective XML schema, further XML elements may be inserted into this structure to indicate for each use of the <taxon> element the respective level of depth within the hierarchy, as follows:

```
<taxonpath>
    <taxon>
        <id>t1</id>
        <entry>Natural Science</entry>
        <taxon>
            <id>t1.1</id>
            <entry>Physical Science</entry>
            <taxon>
                <id>t1.1.1</id>
                <entry>Astronomy</entry>
            </taxon>
        </taxon>
    </taxon>
</taxonpath>
```

An XSLT mapping carried out by the structural processor 440, according to a relevant XSLT stylesheet stored in the conversion rule store 420, is then able to preserve the inserted elements indicating depth within the hierarchy, in particular when mapping to the intermediate canonical structure 300, so that this information is available for use in a second stage conversion to a target XML structure 410 compliant with a further XML schema (415), for example another nested XML structure.

In another example of the operation of the pre-processor 410, consider an input structure 405 of the following type:

```
<item>
    <A>valueA</A>
    <A>valueA1</A>
    <B>valueB</B>
    <B>valueB1</B>
</item>
    If the desired output structure 410 is of the form
<item>
    <a>valueA</a>
    <b>valueB</b>
</item>
``` then there is a problem in using XSLT to select one element from the input structure 405 in a mapping to the output structure 410. That is, in the above input structure 405, the element <A> is intended to map to a non-repeatable element <a> in the output structure 410. The same applies for <B>. In attempting to map one element of the input structure 405 to an element of the output structure 410 using an XSLT statement such as <xsl:value-of select="item/A"/>, the value in both elements <A> would be selected. In this situation, the pre-processor 435 may be arranged to extend the input structure 405 of this example as follows:

```
<item>
    <alltheAs>
        <A map="yes">valueA</A>
        <A map ="no">valueA1</A>
    </alltheAs>
    <alltheBs>
        <B map="yes">valueA</B>
        <B map ="no">valueA1</B>
    </alltheBs>
</item>
```

An XSLT stylesheet (420) may now be applied by the structural processor 440 to this extended structure to make a mapping to the required output structure 410, using an instruction

```
<xsl:for-each select = "item/alltheAs/A">
   in combination with an instruction
      <xsl:if test ="alltheAs/A@map ='yes'">
``` to select the appropriate element <A>, and similarly for element <B>.

The pre-processor 435 may be implemented using the Java™ programming language. The structural processor 440, when for use in converting XML documents, may be implemented as a conventional XSLT processor such as Oracle™ XML parser or the Apache™ Xalan parser. As those in the art will understand, computer programs used to implement this invention may be stored in computer-readable storage media.

Some XML schemata define vocabularies for particular elements, e.g. a <Role></Role> element might have a restricted vocabulary of "Publisher", "Creator", "Editor". Similarly, a schema might restrict the data types that may be used in particular elements. For example, dates may be defined to take the form dd/mm/yy or yy/mm/dd, or a number may be defined to be decimal or hexadecimal. It is advantageous for the apparatus 400 to be able to perform both structural conversion between different schema-compliant XML documents and to be able to translate between vocabularies/data types that they use. These functions are handled in the post processor 445 using techniques that would be familiar to a person skilled in data manipulation.

In a preferred embodiment of the present invention for converting XML documents, an intermediate canonical data structure 300 called "Interlingua" has been devised. In devising the 'Interlingua' structure, the aim has been to provide an intermediate structure that is sufficiently simple and generic that it can be used in the conversion of a wide range of structured information with respect to a wide range of schemata and that it can be easily extended without needing to import unusual or complex structural characteristics specific to one particular schema. The pre-processor 435 is provided to make initial adjustments to a more complex structure in order that the generic Interlingua structure can be used in an intermediate role without additional structural complexity. Another advantageous feature of the chosen Interlingua structure 300 is the particular choice of data element groups that have been created to provide a repository for common data elements and domain-specific data elements when mapping schemata relevant to different fields of information. Certain data elements are largely common to schemata in a number of different information domains while others are more domain-specific. This choice of data element groups in the preferred Interlingua intermediate canonical structure 300 is based upon Part 4 of ISO 11179, "Information Technology—Specification and Standardisation of Data Elements". A preferred top level structure of Interlingua is shown in FIG. 5.

Figure 5:
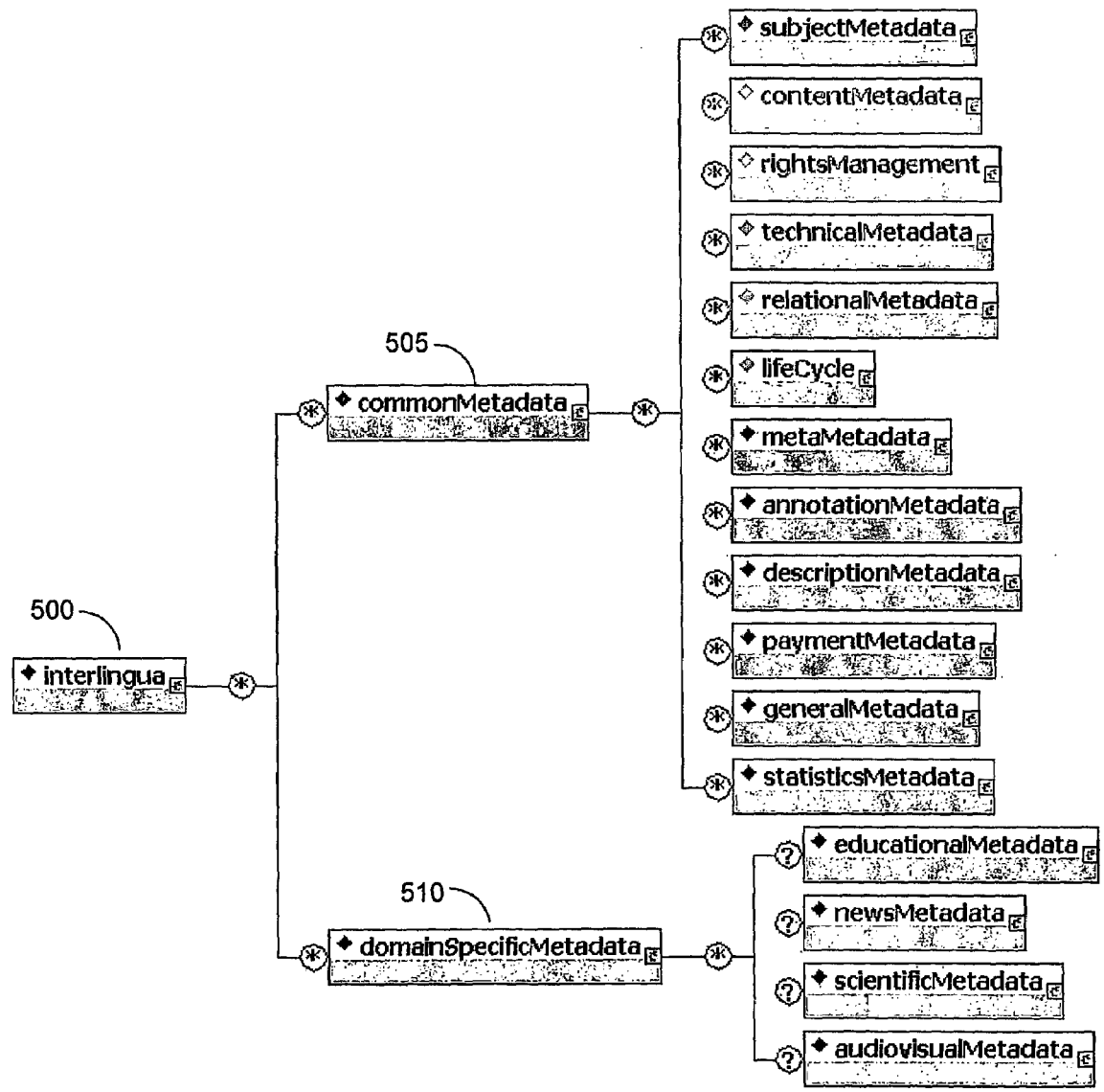
FIG. 5 is a diagram showing top level elements in a preferred intermediate canonical structure for use with preferred embodiments of the present invention.

Referring to FIG. 5, the Interlingua structure 500 is seen to comprise two main categories of metadata: "common Metadata" 505 and "domain-specific Metadata" 510 such as "news" or "education". The common metadata element 505 and its "child" elements, ranging from "subjectMetadata" 515 to "statisticsMetadata", are intended for use in conversions from and to all registered schemata, whereas the domain-specific metadata element 510 and respective child elements are intended for use in conversion of XML documents in specific domains such as education or news. Further domain-specific elements may be added as required by a system administrator, for example according to the fields of information likely to be encountered in the conversion of information data sets. For each registered schema, a corresponding set of elements are inserted, if not already provided, below selected child elements of the common metadata element 505, and below the domain-specific metadata element 510 as required. The resultant intermediate structure 300, 500 thereafter serves both as an output structure 410 to which stored (420) XSLT stylesheets map source XML documents compliant with registered schemata, and as an input structure 405 from which stored (420) XSLT stylesheets generate target XML documents compliant with registered schemata.

Some examples will now be described to show how the Interlingua structure 500 is used as an intermediate canonical structure 300 in a process for converting some of the less straightforward types of XML structure.

Take as a first example the nested structure described above where, following processing by the pre-processor 435 the following XML was output to the structural processor 440:

```
<taxonpath>
   <taxon>
      <id>t1</id>
      <entry>Natural Science</entry>
      <taxon>
         <id>t1.1</id>
         <entry>Physical Science</entry>
         <taxon>
            <id>t1.1.1</id>
            <entry>Astronomy</entry>
         </taxon>
      </taxon>
   </taxon>
</taxonpath>
```

As a result of registering the corresponding XML schema, data elements have been inserted into the Interlingua structure 500 below the "subjectMetadata" element 515, in particular a section to enable a corresponding XSLT stylesheet (420) to map classification data from a source XML document 405. For this example, an XSLT stylesheet (420) will generate the following additional data entries below the "commonMetadata" element 505, preserving information relating to nesting depth as inserted into the input structure 405 by the pre-processor 435:

```
<subjectmetadata>
   <taxon>
      <taxonentry level="1">Natural Science</taxonentry>
      <taxonentry level="1.1">Physical Science</taxonentry>
      <taxonentry level="1.1.1">Astronomy</taxonentry>
   </taxon>
<subjectmetadata>
```

A further stored XSLT stylesheet (420) may then map these data back to a nested structure defined in an output structure 410, for example by means of the substring-after and substring-before functions in XSLT to split the nesting level value and then by calling a template recursively until the bottom of the tree is reached.

In a further example, the following element structure and data have been created and stored in the Interlingua structure 500

```
<additionalInfo>
    <Title>
        <value>requirement</value>
    </Title>
    <additionalInfo>
        <Title>
            <value>type</value>
        </Title>
        <Value>
            <value>browser</value>
        </Value>
    </additionalInfo>
    <additionalInfo>
        <Title>
            <value>name</value>
        </Title>
        <Value>
            <value>IE</value>
        </Value>
    </additionalInfo>
    <additionalInfo>
        <Title>
            <value>minimumversion</value>
        </Title>
        <Value>
            <value>3.0</value>
        </Value>
    </additionalInfo>
    <additionalInfo>
        <Title>
            <value>maximumversion</value>
        </Title>
        <Value>
            <value>6.0</value>
        </Value>
    </additionalInfo>
</additionalInfo>
```

The following XSLT stylesheet has been stored in the conversion rule store 420 to convert from this intermediate Interlingua structure 300, 500 to an output structure 410 compliant with a registered XML schema (415). No pre-processing (435) is required for converting this intermediate structure 300, 500.

```
<xsl:template
match="StoragecommonMetadata/StoragetechnicalMetadata/
StorageadditionalInfo[StorageTitle/Storagevalue = 'requirement']">
    <xsl:element name = "requirement">
        <xsl:element name = "type">
            <xsl:element name = "value">
                <xsl:apply-templates select
="StorageadditionalInfo[StorageTitle/Storagevalue='type']/StorageValue/
Storagevalue"/>
            </xsl:element>
            <xsl:element name = "source">
                <xsl:apply-templates select
="StorageadditionalInfo[StorageTitle/Storagevalue='type']/StorageSubject/
Storagevalue"/>
            </xsl:element>
        </xsl:element>
        <xsl:element name = "name">
            <xsl:element name = "value">
                <xsl:apply-templates select
="StorageadditionalInfo[StorageTitle/Storagevalue='name']/StorageValue/
Storagevalue"/>
            </xsl:element>
            <xsl:element name = "source">
                <xsl:apply-templates select
="StorageadditionalInfo[StorageTitle/Storagevalue='name']/
StorageSubject/Storagevalue"/>
            </xsl:element>
        </xsl:element>
        <xsl:element name = "minimumversion">
```

-continued

```
            <xsl:element name = "value">
                <xsl:apply-templates select
="StorageadditionalInfo[StorageTitle/Storagevalue='minimumversion']/
StorageValue/Storagevalue"/>
            </xsl:element>
        </xsl:element>
        <xsl:element name = "maximumversion">
            <xsl:element name = "value">
                <xsl:apply-templates select
="StorageadditionalInfo[StorageTitle/Storagevalue='maximumversion']/
StorageValue/Storagevalue"/>
            </xsl:element>
        </xsl:element>
    </xsl:element>
</xsl:template>
```

The XSLT stylesheet above is executed by the structural processor 440 to generate the following target XML document 410:

```
<requirement>
    <type>
        <value>
            <langstring>browser</langstring>
        </value>
        <source>
        </source>
    </type>
    <name>
        <value>
            <langstring>IE</langstring>
        </value>
        <source>
        </source>
    </name>
    <minimumversion>
        <value>
            <langstring>3.0</langstring>
        </value>
    </minimumversion>
    <maximumversion>
        <value>
            <langstring>6.0</langstring>
        </value>
    </maximumversion>
</requirement>
```

As described above, the post-processor 445 is arranged in particular to perform vocabulary and data type conversions with reference to post-processor tasks stored in the store 430 in respect of the relevant schemata. There are two types of vocabulary translation: "closed" and "open". "Open" refers to the matching free text to a restricted vocabulary and "closed" refers to the mapping between two restricted vocabularies, e.g. one defined for a source schema and one defined for a target schema. A preferred method by which the post-processor 445 performs a "closed" vocabulary conversion will now be described with reference to FIG. 6.

Figure 6:
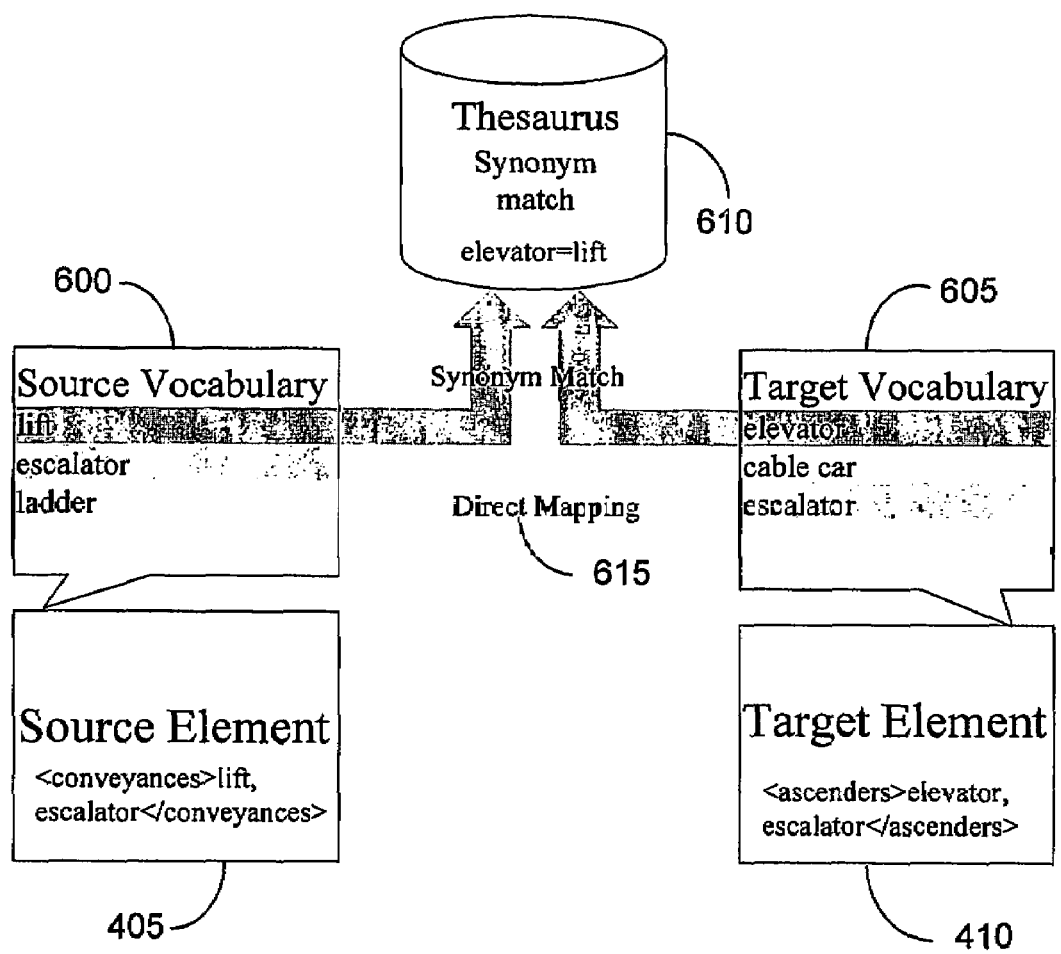
FIG. 6 is a diagram to illustrate a preferred technique for translation of terms occurring in data sets to be converted.

Referring to FIG. 6, a "source vocabulary" 600 of terms is defined in respect of a schema (415) associated with a source data set 405 to be converted. A "target vocabulary" 605 of terms is defined in respect of a schema (415) associated with a target data set 410. A thesaurus 610 or other database for use in synonym matching is also provided. The post-processor 445 is arranged, under the control of stored post-processor tasks (430) to identify mappings between terms defined in the source vocabulary 600 and terms defined in the target vocabulary 605. Certain terms may be mapped directly, e.g. "escalator" as shown in the mapping 615. However, a particular term of the source vocabulary 600, e.g. "lift", may not be mapped directly between source 600 and target 605 vocabularies. In this case a reference to the thesaurus 610 must be made by the post-processor 445 to obtain a set of synonyms for the unmapped term with the expectation that at least one term resulting from the synonym match (610) may be mapped to a term of the target vocabulary 605. Preferably a conventional word stemming algorithm, e.g. the Porter Stemmer algorithm referenced above, is used to stem terms prior to obtaining synonym matches (610). In this example, a synonym match (610) has found that source vocabulary term "lift" is equivalent to "elevator". The post-processor 445 may then compare the results of the synonym match (610) with terms defined in the target vocabulary 605 and select a term that matches for use in generating the target data set 410. Preferably, when the post-processor 445 identifies a mapping using the thesaurus 610, particularly between terms of closed vocabularies, the post-processor 445 may be arranged to store the mapping as direct mapping between the respective terms so that subsequent conversions do not entail a reference to the thesaurus 610.

The post-processor 445 may also be arranged to carry out translation of terms into other languages as part of the conversion process. To achieve this, one of a number of conventional translation engines may be used, e.g. in the form of a plug-in component to the post-processor 445. Language translation may be combined with the synonym matching process described with reference to FIG. 6 as required.

While references to XML in the present patent specification are to Version 1.0 of XML and to the versions of XML Schema and XSLT as defined at the date of filing the present patent specification, it would be clear to a person of ordinary skill in the field of information processing that the teaching in the present patent specification may be applied readily to the conversion of future versions of XML and similar structured information sets having structural characteristics similar to those referred to herein.

What is claimed is:

1. An apparatus comprising:
   at least one processor having an input and an output and at least one storage device connected for access by said at least one processor, apparatus being configured to convert a first data set comprising metadata structured according to one of a plurality of first predefined hierarchical metadata structures into a second data set comprising said metadata structured according to one of a plurality of second predefined hierarchical metadata structures, the apparatus being configured by executable computer program code to provide, during execution thereof:
   a store storing mappings, respectively corresponding to each of said first hierarchical metadata structures, between data elements of said first predefined hierarchical metadata structures and data elements of a predefined intermediate hierarchical metadata structure and mappings, respectively corresponding to each of said second predefined hierarchical metadata structures, between data elements of said predefined intermediate hierarchical metadata structure and data elements of said second predefined hierarchical metadata structures;
   an input which receives a data set comprising metadata to be converted;
   data conversion means arranged to select mappings from said stored mappings in dependence on structure of data elements in said received data set and in dependence on structure of a selected predefined target hierarchical metadata structure, and to apply the selected mappings to generate a target data set having said predefined target hierarchical metadata structure; and
   an output which outputs a converted data structure based on said target data set,
   on receipt of a first data set structured according to one of said plurality of first predefined hierarchical metadata structures, the data conversion means are configured to generate from said first data set structured according to said first predefined hierarchical metadata structure, a first target data set having said predefined intermediate hierarchical metadata structure and thereafter to generate from said first target data set having said predefined intermediate hierarchical metadata structure, a second target data set having said second predefined hierarchical metadata structure,
   wherein said first and second predefined hierarchical metadata structures are selected from a set of n predefined hierarchical metadata structures, each having hierarchical depth greater than 1, where n is an integer greater than 3; and
   wherein said store stores mappings between data elements of each of said n predefined hierarchical metadata structures, one of which is selected as said first predefined hierarchical metadata structure and data elements of said predefined intermediate hierarchical metadata structure, and between data elements of said predefined intermediate hierarchical metadata structure and data elements of each of said n predefined hierarchical metadata structures, one of which is selected as said second predefined hierarchical metadata structure.

2. The apparatus as in claim 1, that is used in a hub data set conversion arrangement whereby conversions between data sets having differing structures are achieved using stored mappings between one or more of said differing structures and said predefined intermediate hierarchical metadata structure.

3. The apparatus as in claim 1, further comprising pre-processing means arranged to carry out pre-processing tasks with regard to said data elements defined according to said first predefined hierarchical metadata structures.

4. The apparatus as in claim 3, wherein said pre-processing tasks include adjusting the structure of data elements in said received data set.

5. The apparatus as in claim 1, further comprising post-processing means arranged to carry out post-processing tasks with regard to data elements defined according to said second predefined hierarchical metadata structures.

6. The apparatus as in claim 5, wherein said post-processing tasks include performing a semantic translation of terms contained in a received data set into terms defined according to said predefined target hierarchical metadata structure.

7. The apparatus as in claim 6, wherein said post-processing means are arranged with access to a thesaurus, and wherein said semantic translation of terms in said received data set comprises:
   (a) obtaining, from the thesaurus, at least one term that is semantically equivalent to a term of said received data set;
   (b) comparing said at least one semantically equivalent term with a set of terms defined according to said predefined target hierarchical metadata structure; and
   (c) in the event of a positive match, selecting a matching term for use in said semantic translation.

8. The apparatus as in claim 1, wherein said data set to be converted is a set of information annotated using a structured mark-up language.

9. The apparatus as in claim 8, wherein said structured mark-up language is the XML structured mark-up language.

10. A method comprising: converting a data set comprising metadata structured according to one of a plurality of first predefined hierarchical metadata structures into a data set comprising metadata structured according to one of a plurality of second predefined hierarchical metadata structures, by: executing at least one computer program on at least one processor having input, output and access to memory connections to cause the following to occur:
 (i) receiving a data set comprising metadata elements structured according to one of said first predefined hierarchical metadata structures;
 (ii) applying a first set of rules to convert said hierarchical metadata elements in the received data set into an intermediate data set comprising data elements of a predefined intermediate hierarchical metadata structure;
 (iii) applying a second set of rules to convert said intermediate data set into a metadata set comprising data elements structured according to one of said second predefined hierarchical metadata structures; and
 (iv) outputting data based on said one of said second predefined hierarchical metadata structures;
 wherein said first and second predefined hierarchical metadata structures are selected from a set of n predefined hierarchical metadata structures, each having hierarchical depth greater than 1, where n is an integer greater than 3; and
 wherein said first set of rules and said second set of rules are selected from a store in which are stored mappings, respectively corresponding to each of said first predefined hierarchical metadata structures, between metadata elements of each of said n p redefined hierarchical metadata structures, one of which is selected as said first predefined hierarchical metadata structure and data elements of said predefined intermediate hierarchical metadata structure, and between data elements of said predefined intermediate hierarchical metadata structure and data elements of each of said n predefined hierarchical metadata structures, one of which is selected as said second predefined hierarchical metadata structure.

11. The method as in claim 10, wherein:
 said first set of rules comprise mappings between said data elements structured according to said first predefined hierarchical metadata structure and data elements of said predefined intermediate hierarchical metadata structure; and
 said second set of rules comprise mappings between said data elements of said predefined intermediate hierarchical metadata structure and said data elements structured according to said second predefined hierarchical metadata structure.

12. The method as in claim 10, wherein, prior to applying said first set of rules at step (ii), at least one pre-processing task is carried out on the data set received at step (i).

13. The method as in claim 10, wherein, prior to applying said second set of rules at step (iii), at least one pre-processing task is carried out on the intermediate data set generated at step (ii).

14. The method as in claim 12, wherein said at least one pre-processing task comprises adjusting the structure of said data elements in said data set.

15. The method as in claim 10, further comprising:
 (iv) carrying out at least one post-processing task on said data set, generated at step (iii), comprising data elements structured according to said second predefined hierarchical metadata structure.

16. The method as in claim 15, wherein said at least one post-processing task comprises performing a semantic translation of terms contained in said data set generated at step (iii).

17. The method as in claim 16, wherein performing the semantic translation of terms contained in said data set generated at step (iii) comprises:
 (a) obtaining, from a thesaurus, at least one term that is semantically equivalent to a term of said data set generated at step (iii);
 (b) comparing said at least one semantically equivalent term with a set of terms defined according to said second predefined structure; and
 (c) in the event of a positive match, selecting a matching term for use in said semantic translation.

18. The method as in claim 10, wherein said data sets structured according to said predefined structures are sets of information annotated using a structured mark-up language.

19. The method as in claim 18, wherein said structured mark-up language is the XML structured mark-up language.

* * * * *